United States Patent [19]

Brackman et al.

[11] Patent Number: 5,120,481

[45] Date of Patent: Jun. 9, 1992

[54] PROCESS FOR PREPARING EXTRUDED FOAM BODIES

[75] Inventors: Joseph A. Brackman; Raymond M. Breindel, both of Uniontown, Ohio

[73] Assignee: U.C. Industries, Inc., Parsippany, N.J.

[21] Appl. No.: 598,020

[22] Filed: Oct. 12, 1990

Related U.S. Application Data

[63] Continuation-in-part of Ser. No. 316,649, Feb. 28, 1989, abandoned.

[51] Int. Cl.⁵ .............................................. B29C 47/88
[52] U.S. Cl. ...................................... 264/51; 264/53; 264/321; 425/4 C; 425/817 C
[58] Field of Search ............... 264/51, 568, 45.9, 321, 264/53; 425/388, 817 C, 4 C

[56] References Cited

U.S. PATENT DOCUMENTS

| | | |
|---|---|---|
| 3,026,272 | 3/1962 | Rubens et al. . |
| 3,026,273 | 3/1962 | Engles . |
| 3,287,477 | 11/1966 | Vesilind . |
| 3,303,076 | 2/1967 | Carlson Jr. et al. ................. 156/79 |
| 3,770,668 | 11/1973 | Corbett et al. . |
| 3,817,669 | 6/1974 | Buckner . |
| 3,897,528 | 7/1975 | Suh . |
| 4,085,073 | 4/1978 | Suh et al. . |
| 4,229,396 | 10/1980 | Suh et al. . |
| 4,271,107 | 6/1981 | Phipps ................................. 264/51 |
| 4,371,488 | 2/1983 | Phipps et al. ........................ 264/51 |
| 4,395,214 | 7/1983 | Phipps et al. ........................ 264/51 |
| 4,421,866 | 12/1983 | Suh et al. . |
| 4,438,224 | 3/1984 | Suh et al. . |
| 4,487,731 | 12/1984 | Kobayashi .......................... 264/51 |
| 4,528,300 | 7/1985 | Park . |
| 4,559,367 | 12/1985 | Hurps et al. . |
| 4,640,933 | 2/1987 | Park . |
| 4,694,027 | 9/1987 | Park . |
| 4,783,291 | 11/1988 | Pagan ................................. 425/71 |
| 4,912,140 | 3/1990 | Tusim ................................. 521/60 |
| 4,916,166 | 4/1990 | Suh et al. .......................... 521/60 |

FOREIGN PATENT DOCUMENTS

| | | |
|---|---|---|
| 1086450 | 9/1980 | Canada . |
| 008836 | 3/1980 | European Pat. Off. . |
| 1595015 | 7/1970 | France ............................... 264/51 |
| 8808013 | 10/1988 | World Int. Prop. O. . |

OTHER PUBLICATIONS

ASTM D2126-87 Standard test method for response of rigid cellular plastics to thermal and humid aging, Apr. 1987, pp. 208-209.
ASTM C578-87a—Standard specification for preformed, cellular polystyrene thermal insulation, Jul. 1987, pp. 201-205.

Primary Examiner—Jeffery Thurlow
Attorney, Agent, or Firm—Renner, Otto, Boisselle & Sklar

[57] ABSTRACT

A process for preparing an extruded thermoplastic resin elongate foam body comprising an alkenyl-substituted aromatic resin characterized as having a density of between about 0.9 to about 3.5 pounds per cubic foot is described. The process comprises the steps of (A) heat plastifying the thermoplastic resin; (B) adding at least one fluid blowing agent comprising at least one of 1-chloro-1,1-difluoroethane, 1,1,1,2-tetrafluoroethane and 2-chloro-1,1,1,2-tetrafluoroethane; (C) uniformly mixing the blowing agent in the resin under a pressure sufficient to prevent blowing of the resin thereby forming a blowable resin mixture; (D) extruding the mixture into a region of reduced pressure which is less than atmospheric pressure wherein the blowable resin mixture expands into a foam body; and (E) cooling the foam body. In one embodiment, the region of less than atmospheric pressure is formed by an elongated chamber with the blowable resin mixture passing through a die at one end of such chamber and such foam body passing through a pool of water at the opposite end of the chamber. The process results in the formation of extruded expanded thermoplastic resins such as polystyrene resins characterized as having relatively small average cell sizes such as from about 0.2 to about 0.5 mm., improved and higher compressive strengths, and higher cell volumes.

52 Claims, 1 Drawing Sheet

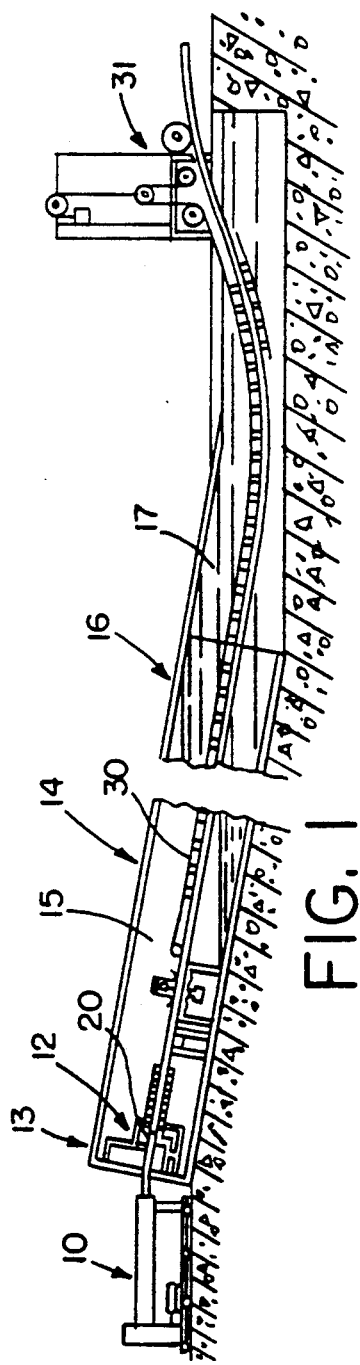
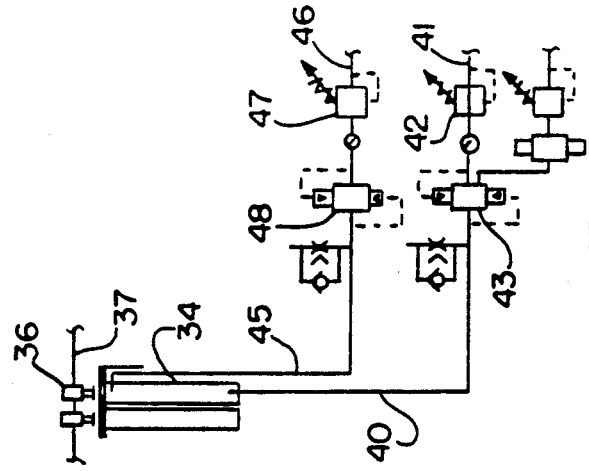
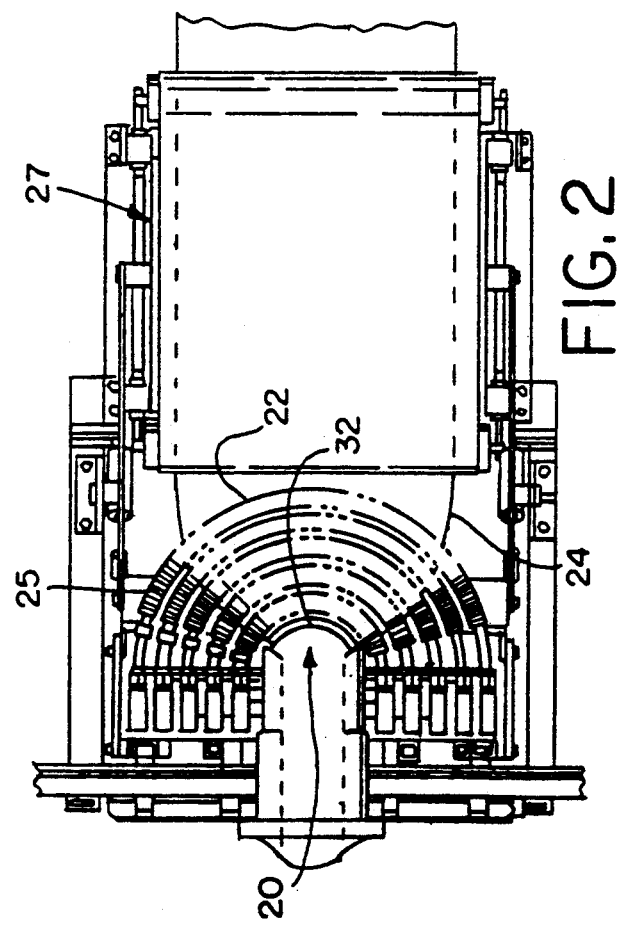

PROCESS FOR PREPARING EXTRUDED FOAM BODIES

This is a continuation-in-part of copending application Ser. No. 07/316,649 filed on Feb. 28, 1989 now abandoned.

FIELD OF THE INVENTION

The present invention relates to a process for preparing extruded foams which are in the form of billets or boards and which are characterized as having a density between about 0.9 and about 3.5 pounds per cubic foot. More particularly, the invention relates to the preparation of extruded foamed thermoplastic resin wherein the foaming occurs in a region of subatmospheric pressure.

BACKGROUND OF THE INVENTION

Extruded synthetic resinous foams are highly desirable for many applications including thermal insulation, decorative purposes, packaging and the like. One particularly important application for styrene polymer foams is in the field of thermal insulation. In this application, it is desirable that the insulating value of the foam be maintained for as long a period as possible and that the foam have dimensional stability. The present invention relates to polymer foams which are the so-called "extruded foams". The extruded foams generally have a fairly uniform cell size and are thus particularly useful for thermal insulation.

Another important characteristic of polymer foam is the density of the foam which generally may vary from about 1 to about 5 or more pounds per cubic foot. Densities of greater than about 2 pounds per cubic foot for polystyrene foams are common, and many such materials are commercially available. The relationship between density and cell size is an important consideration when the foamed product is to be utilized for thermal insulation. It generally is difficult to prepare foamed structures having low density (i.e., less than two pounds per cubic foot) while maintaining the desirable small cell sizes. Generally, as the density of the structure is decreased, the cell size becomes relatively larger, and attempts to obtain low density materials with relatively small cell size by controlling the amount of blowing agent and the temperature of the extrudate have not been completely successful. As the cell sizes are reduced, the material tends to have a higher density.

For a considerable period of time, styrene polymer foams have been extruded employing various halocarbons such as methyl chloride or ethyl chloride alone as blowing agents or as mixtures with chlorofluorocarbons (generally referred to as CFCs) such as dichlorodifluoromethane. Procedures which have utilized methyl chloride or ethyl chloride either alone or in combination with other blowing agents generally require that the extruded material be aged for a period of time sufficient to permit the methyl chloride or ethyl chloride to leave the cells and for air to enter by an appropriate diffusion process through the cell walls.

U.S. Pat. No. 4,393,016 describes the preparation of styrene polymer foams utilizing a mixture of ethyl chloride, methyl chloride and dichlorodifluoromethane as the blowing agents. U.S. Pat. No. 4,451,417 describes the use of a mixture of ethyl chloride and dichlorodifluoromethane.

In recent years, there has been significant pressure applied by the environmentalists and the government for the reduction, if not a complete ban, on the use of the chlorofluorocarbons (CFCs) for applications including aerosols, refrigerants, foam-blowing agents and specialty solvents within the electronics and aerospace industries. Examples of chlorofluorocarbons (CFCs) which have been utilized for these purposes include CFC-11 which is chlorotrifluoromethane, CFC-12 which is dichlorodifluoromethane, and CFC-113 which is 1,2,2-trifluoro-1,1,2-trichloroethane. Some attempts have been made in the past to replace the CFCs with hydrocarbons such as butane or inert gases such as carbon dioxide. For example, a blowing agent mixture of carbon dioxide and an alkane is described in U.S. Pat. Nos. 4,344,710 and 4,424,287. Other suggestions have been made in the prior art for the replacement or partial replacement of the CFCs which contain no hydrogen atoms with fluorohydrocarbons or chlorofluorohydrocarbons which, as the name applies, contain at least one hydrogen. These materials have been generally referred to as "soft CFCs", "HCFCs" and "HFCs".

A particular advantage of the HCFCs and HFCs or soft CFCs is that the ozone depletion potentials of these materials are significantly less than the ozone depletion potential of the CFCs. The ozone depletion potential is a relative measure of the capability of the material to destroy the ozone layer in the stratosphere. HCFCs and HFCs such as chlorodifluoromethane (F-22), 1,1-dichloro-2,2,2-trifluoroethane (F-123), 1-chloro-1,1-difluoroethane (F-142b), 1,1,1,2-tetrafluoroethane (F-134a), and 1,1-dichloro-1-fluoroethane (F-141b) have been found to have reduced ozone depletion potentials and may be acceptable substitutes for the CFCs. British Patent 1,537,421 describes styrene polymer foam bodies which have been extruded from mixtures utilizing as blowing agent, at least one compound of the formula $$R_1-CF_2-R_2$$

in which $R_1$ is methyl, ethyl, chloromethyl, fluoromethyl, chlorofluoromethyl, difluoromethyl or trifluoromethyl, and $R_2$ is hydrogen, chloro, fluoro, trifluoromethyl or methyl with the proviso that the compound contains not more than 3 carbon atoms, and if the compound contains only 2 fluorine atoms, it must contain 3 carbon atoms. The cells of the foam bodies prepared utilizing these blowing agents are reported as being substantially uniform and having a size of from 0.1 to 1.2 millimeters. The densities of the foam bodies are reported to be from 1 to 5 pounds per cubic foot. In one embodiment, one or more of the above blowing agents is combined with a second blowing agent having a permeability through the polymer of greater than 0.017 times that of nitrogen. Examples of such second blowing agents include methyl chloride, ethyl chloride, chlorodifluoromethane, fluorochloromethane and 1,1-difluoroethane.

British Patent 1,562,026 describes the preparation of styrene foams utilizing blowing agents similar to those described in British Patent 1,537,421 with the exception that $R_1$ is dichloromethyl.

The use of a mixture of carbon dioxide, ethyl chloride and dichlorodifluoromethane (F-12), or 1-chloro-1,1-difluoroethane (F-142b) or mixtures thereof is described in U.S. Pat. No. 4,636,527. Nucleating agents may be incorporated into the foamable mixture to reduce the primary cell size. Examples of nucleating agents include talc, calcium silicate, indigo, etc.

The use of mixtures of blowing agents for preparing expanded closed cell foams of polystyrene resin also is subject to U.S. Pat. No. 3,960,792. The foaming agent mixture is one which has a diffusion rate through the polystyrene resin which is about 0.75 to 6 times the diffusion rate of air through polystyrene resin. Specific examples of such mixtures listed in the patent include methyl chloride and dichlorodifluoromethane; methyl chloride, neopentane and dichlorodifluoromethane; methyl chloride, difluorodichloromethane and dichlorotetrafluoroethane. The foaming agent mixture utilized in the formation of the polystyrene must be a non-solvent for the polystyrene resin.

U.S. Pat. No. 3,770,668 describes polystyrene foam bodies containing a plurality of closed gas-containing cells wherein the foam contains the specified amount of dichlorodifluoromethane, trichlorofluoromethane or 1,2-dichlorotetrafluoroethane, the average cell size is from about 0.1 to 0.45 millimeter, and the density of the foam body is from about 1.4 to 1.8 pounds per cubic foot. The foaming agent of polystyrene foams contains in addition to the chlorofluorocarbons mentioned above, an additional halocarbon selected from methyl chloride, ethyl chloride, vinyl chloride and mixtures thereof.

The general procedure utilized in the preparation of extruded synthetic resinous foam bodies generally involves the following steps. An alkenyl-substituted aromatic resin such as a polystyrene resin is heat plastified and one or more fluid blowing agents is incorporated and thoroughly mixed into the plastified resin under conditions which permit thorough mixing of the volatile blowing agent into the plastified resin and preventing foaming of the mixture. The intimate mixture of resin and blowing agents which may contain other optional additives including, for example, nucleating agents, flame-retardants for the foam, plasticizer, etc., is cooled, and the pressure on the mixture is reduced which results in foaming of the mixture and formation of the desirable foamed body. Foam bodies having desirable properties are obtained by extruding the cooled plastified mixture of resin and blowing agents into a region of lower pressure. In some foam extrusion processes, the foamable mixture is extruded into a vacuum chamber so that the expansion of the foam is accomplished under subatmospheric pressure. Examples of vacuum foam extrusion apparatuses and methods may be found in U.S. Pat. Nos. 3,584,108; 3,169,272; and 3,822,331. One of the difficulties when utilizing vacuum extrusion technology relates to the curing and extraction of the material from a vacuum chamber, specially when the material is delicate or fragile such as styrene foam in the form of large boards or billets. A solution to this problem involves the use of an incline barometric leg as described in U.S. Pat. Nos. 3,704,083 and 4,044,084. Further modifications and improvements in extrusion apparatus utilizing a large barometric leg which when evacuated is essentially filled with water, but which includes a vacuum chamber at its upper end into which the extrudate passes from the die for expansion is described in U.S. Pat. No. 4,199,320.

SUMMARY OF THE INVENTION

A process for preparing an extruded elongate foam body comprising an alkenyl-substituted aromatic thermoplastic resin and characterized as having a density of between about 0.9 to about 3.5 pounds per cubic foot is described. The process comprises the steps of (A) heat plastifying said thermoplastic resin;

(B) adding at least one fluid blowing agent comprising at least one of 1-chloro-1,1-difluoroethane, 1,1,1,2-tetrafluoroethane and 2-chloro-1,1,1,2-tetrafluoroethane;

(C) uniformly mixing the blowing agent in the resin under a pressure sufficient to prevent blowing of the resin thereby forming a blowable resin mixture;

(D) extruding the mixture into a region of reduced pressure which is less than atmospheric pressure wherein the blowable resin mixture expands into a foam body; and (E) cooling the foam body.

In one embodiment, the region of less than atmospheric pressure is formed by an elongated chamber with the blowable resin mixture passing through a die at one end of such chamber and such foam body passing through a pool of water at the opposite end of the chamber. The process results in the formation of extruded expanded thermoplastic resins such as polystyrene resins characterized as having the desired densities, relatively small average cell sizes such as from about 0.2 to about 0.5 mm., improved and higher compressive strengths, and higher cell volumes.

BRIEF DESCRIPTION OF THE DRAWINGS

FIG. 1 is a schematic broken side elevation of preferred apparatus for practicing the present invention;

FIG. 2 is an enlarged fragmentary top plan view of the fan-shape-arcuate slot die and shaping mechanisms at the die end of the vacuum chamber; and FIG. 3 is a schematic illustration of one of the pneumatic piston-cylinder assemblies for floating the shaping rolls or subsequent upper conveyor.

DESCRIPTION OF THE PREFERRED EMBODIMENTS

Throughout the specification and claims, all parts and percentages are by weight unless otherwise indicated.

The thermoplastic resins which are extruded and foamed in accordance with the process comprise alkenyl-substituted aromatic resins (homopolymers and copolymers), polyphenylene ethers, polyvinyl chloride, vinylidene chloride resins such as copolymers of vinylidene chloride (80 parts) and acrylonitrile (20 parts), polyolefin resins such as polyethylene and copolymers of ethylene and vinyl acetate or ethyl acrylate, etc. Mixtures of such resins may be prepared and foamed in accordance with the process of the invention. For example, mixtures of a styrene resin and a polyphenylene ether can be foamed to produce foam bodies by the process of the invention. The preferred thermoplastic resins are the alkenyl-substituted aromatic resins.

The alkenyl-substituted aromatic resins which are extruded and foamed in accordance with the process of the present invention are polymers which comprise at least 50% of a monomer which is at least one alkenyl aromatic compound characterized by the general formula $$Ar-C(R)=CH_2 \qquad (I)$$

wherein Ar represents an aromatic hydrocarbon group or an aromatic halohydrocarbon group of the benzene series and R is hydrogen or a methyl group. The remaining monomer used in the preparation of the polymer comprises at least one ethylenically unsaturated monomer which is copolymerizable with the aromatic compound.

In one embodiment, the alkenyl aromatic compound of Formula I may be represented by the following formula

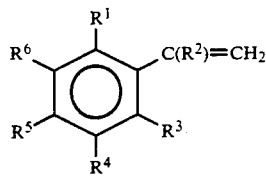

(II)

wherein $R^1$, $R^3$, $R^4$, $R^5$ and $R^6$ are each independently hydrogen, chlorine, bromine, or alkyl groups containing from 1 to about 4 carbon atoms, and $R^2$ is hydrogen or methyl, with the proviso that a total number of carbon atoms in the monomer does not exceed 12.

Examples of such alkenyl-substituted aromatic monomers include styrene, alpha-methylstyrene, o-methylstyrene, m-methylstyrene, p-methylstyrene, o-chlorostyrene, p-chlorostyrene, 2,6-dichlorostyrene, o-bromostyrene, etc. Examples of ethylenically unsaturated monomers which are copolymerizable with the above styrene derivatives include methylmethacrylate, acrylonitrile, maleic anhydride, citraconic anhydride, itaconic anhydride, etc.

The preferred alkenyl-substituted aromatic resin for use in the process of the present invention is styrene resin. Styrene resins which are useful in the process of this invention may be homopolymers of a styrene or copolymers of styrene with one or more copolymerizable ethylenically unsaturated monomers as described above. Such polymers and copolymers of styrene are available from a variety of commercial sources in a variety of molecular weights. The molecular weights of such polymers can be determined by several methods well known to those skilled in the art, such as intrinsic viscosity, light scattering, and ultracentrifuge sedimentation. The flow rate of the melted polymer through an orifice, sometimes described as melt flow index (MFI) also may be used to compare molecular weight relationships. MFI is a low cost, easily performed technique. Details may be found in a number of publications, such as *Principles of Polymer Chemistry*, by P. J. Flory, Cornell University Press, Ithaca, N.Y., 1953. Polymers having weight average molecular weights of from about 100,000 to about 500,000 are useful, with preferred about 150,000 to about 450,000 and most preferred about 250,000 to about 350,000.

Useful styrene resins (also referred to herein as polystyrenes) are available commercially from a variety of sources and the resins are available with different properties such as melt flow index. For example, polystyrenes are available from ARCO Chemical Company under the general designation "DYLENE", for example DYLENE D-8, and from Polysar Ltd., Sarnia, Ontario.

In one embodiment, the properties of the extruded, Zexpanded foamed products obtained by the process of the present invention can be controlled and modified by the selection of the molecular weight of the resins. For example, the preparation of lower density foam polystyrene bodies is facilitated by using higher molecular weight resins whereas the preparation of higher density foam bodies is facilitated by the use of lower molecular weight or higher viscosity resins.

Specific examples of polymers of styrene which are copolymers include those obtained from mixtures such as: 70% styrene and 30% acrylonitrile; 80% styrene and 20% vinyl toluene; 75% styrene and 25% methylmethacrylate; etc.

The volatile and fluid blowing agents utilized in the present invention comprise at least one of 1-chloro-1,1-difluoroethane (HCFC-142b), 1,1,1,2-tetrafluoroethane (HFC-134a) and 2-chloro-1,1,1,2-tetrafluoroethane (HCFC-124). The amount of the blowing agent added to the heat-plastified alkenyl-substituted aromatic resins is from about 3 to about 16 parts or more by weight per 100 parts by weight of resin. Variations in the amount of blowing agent incorporated into the resin may be utilized, depending in part on the components of the blowing agent mixtures, to prepare extruded foamed bodies having different desirable characteristics.

In addition to 1-chloro-1,1-difluoroethane, 1,1,1,2-tetrafluoroethane, and 2-chloro-1,1,1,2-tetrafluoroethane, the blowing agents utilized in the process may contain other volatile materials which are effective blowing agents. Examples of optional and supplemental blowing agents include dichlorodifluoromethane (CFC-12), chlorodifluoromethane (HCFC-22), carbon dioxide, or mixtures thereof. Mixtures of blowing agents comprising from about 25% to 75% of 1-chloro-1,1-difluoroethane or 1,1,1,2-tetrafluoroethane or 2-chloro-1,1,1,2-tetrafluoroethane, and about 25% to 75% of at least one of CFC-12 and HCFC-22 are useful. Particularly useful mixtures of blowing agents include mixtures comprising: 70-30% of 1-chloro-1,1-difluoroethane and 30-70% of 1,1,1,2-tetrafluoroethane; 50-70% of 1-chloro-1,1-difluoroethane and 30-50% of chlorodifluoromethane; 60-80% of 1-chloro-1,1-difluoroethane and 20-40% of dichlorodifluoromethane; the combination of carbon dioxide with a mixture comprising 60% of 1-chloro-1,1-difluoroethane and 40% of dichlorodifluoromethane and; the combination of carbon dioxide and a mixture comprising 68% of 1-chloro-1,1-difluoroethane and 32% of dichlorodifluoromethane; etc. The optional use of carbon dioxide in combination with the fluorocarbon blowing agents results in the production of extruded expanded polystyrene bodies characterized as having smaller cell sizes when compared to similar density bodies produced with similar fluorocarbons but without carbon dioxide. Additionally, the blowing agent blends including carbon dioxide produce extruded expanded polystyrene bodies characterized by improved compressive strengths at comparable densities. When carbon dioxide is used in combination with one or more halocarbons, from about 0.4 to about 1.5% by weight of carbon dioxide is used based on the weight of the resin. Extruded expanded polystyrene bodies of acceptable characteristics are obtained utilizing the above blowing agent and blowing agent mixtures, and there is no necessity to use blowing agents having high volatility and high diffusion rates through the polystyrene such as methyl chloride, ethyl chloride, etc. Alcohols are not required and are generally not included in the blowable mixtures. Examples of alcohols included in blowing agent mixtures of the prior art but which are not used herein include methanol, ethanol and isopropyl alcohol.

The blowing agent or blowing agent mixture utilized in the process may be added to the alkenyl-substituted aromatic resin in any conventional manner. In one embodiment, the blowing agent or blowing agent mixture may be directly injected into a heat plastifying and mixing apparatus such as an extruder. When more than one blowing agent is to be utilized, each of the blowing agents may be separately injected into the heat-plastified resin. In one preferred embodiment, tandem extruders shown generally at 10 in FIG. 1 are utilized with the primary extruder used to introduce the blowing agent and mixing and the second extruder to control the mixing and cooling of the material. In addition to the plastified resin and blowing agent(s), the blowable resin mixtures may contain, and generally do contain other additives which are included to modify certain characteristics and or properties. Nucleating agents may be included to reduce the primary cell size. Suitable materials include talc, calcium silicate, calcium carbonate, indigo, etc. Generally from about 0.05 to about 5 parts of nucleating agent per 100 parts of resin is incorporated into the foamable resin. Plasticizers may also be added to the foamable mixture, and examples include liquid paraffin, hydrogenated coconut oil, etc. Other useful additives include flame-retardant chemicals, stabilizers, etc.

From the extruder, the heat-plastified resin-blowing agent mixture is extruded into a region of reduced pressure which is less than atmospheric pressure. That is, the region comprises a vacuum chamber wherein the pressure can be controlled at desired levels to allow the blowable resin mixture to expand into a foam body within the vacuum chamber. The pressure within the vacuum chamber can be varied to facilitate the formation of foamed bodies having different but desired characteristics including cell size, cell volume and density. The pressure within the vacuum chamber generally will be maintained at less than 27 in. of Hg absolute and generally within the range of from about 2 to about 27 in. of Hg absolute. In some applications, the pressure will be maintained between about 2 and 20 in. of Hg absolute. In general, as the vacuum is increased (lower pressure), foaming of the mixture is facilitated and lower density foams are produced.

In one preferred embodiment of the invention as seen in FIG. 1, the die end 12 of the secondary extruder described above is designed to fit into, and seal off, the upper end 13 of an inclined tunnel 14 that forms a vacuum chamber or barometric leg 15. The lower end 16 of the tunnel is immersed in a pool of water 17 that seals off the other end of the vacuum chamber. The pool of water provides a mechanism of removing the finished board from the chamber without breaking the vacuum. The extruded polystyrene foamed body formed within the vacuum chamber is advanced through the chamber, through the water and then out of the vacuum chamber to atmospheric pressure on the other side of the water seal. In addition to providing a mechanism for maintaining the vacuum within the chamber, the pool of water is used to cool the foam body within the chamber.

In general operation, the extruded foam exits the die 20 seen more clearly in FIG. 2, and expansion of the mixture and shaping of the foam are controlled by arcuate rolls 22 positioned above and below the plane of the die orifice. The foam indicated at 24 exiting the die is sized for thickness, and spread out to its final width by the illustrated sets of upper and lower rolls which comprise driven wafers 25 rotating on curved axles. As illustrated, there are five such wafer roller sets above and below the foam as it exits the fan-shape die 20. Further thickness and flatness control is provided by passing the foamed panel through paired upper and lower conveyor belts 27. Foam density is determined in part by controlling the vacuum level. After the extruded foam has been sized for thickness, width and flatness, the foam is carried through the water beneath conveyor 30 driven at 31, and as the foam travels through the water it is cooled and becomes more rigid. The foam can be carried through the water seal by any convenient apparatus such as conveyor belt illustrated. In one embodiment, the foam body is carried through the water by an upper conveyor belt, the foam being held against the belt by its own flotation properties. In the illustrated preferred embodiment, the extrusion die 20 is a fan-shape die having an arcuate slot orifice 32, and the mixture exiting such fan-shape die is confined by floating shaping rolls shown.

As seen in FIGS. 2 and 3, in order to more precisely control the rolls 22 as well as the conveyors 27, they may be mounted for floating movement by piston-cylinder assemblies 34. The rods of such assemblies as seen at 36 are connected to brackets 37 in turn supporting the respective rolls or the conveyor. There may be a piston-cylinder assembly for each.

Air may be supplied to the blind end or bottom of each cylinder through line 40 from source 41 through pressure regulator 42 and control valve 43. Thus a controlled pressure may be provided to the lower end of each cylinder elevating a roll 22 against its weight causing the roll essentially to float. When such floating is achieved pressure is applied to the rod end through line 45 from source 46 through regulator 47 and control valve 48. This precisely controls the pressure of the roll against the foaming body. Because of the different radius size of each roll 22, the tare or dead weights will differ. Once floating is achieved only a slight pressure differential is employed so that the force exerted by the roll is quite gentle.

For a more detailed disclosure of a vacuum chamber, shaping mechanism and fan-shape die which may employed, reference may be had to prior U.S. Pat. Nos. 4,199,310; 4,234,529; and 4,364,722.

The alkenyl-substituted aromatic foam bodies prepared in accordance with the invention are characterized generally as follows:

Density: about 0.9 to
 about 3.5 Pcf, preferably about 0.9 to about 3.0, about 0.9 to about 2.5, about 0.9 to about 2, or between about 0.9 to about 1.6;

Average Cell Size:
 about 0.2 to 0.5 mm.

Cell Volume:
 >100,000/cu.in. at lower densities; preferably
 >150,000/cu.in. at lower densities;
 >200,000/cu.in. at densities of from about 1.3 to 1.6;
 >250,000/cu.in. at densities of from about 1.6 to 2.0;
 >300,000/cu.in. at densities above 2.0.

The following examples illustrate the process of the present invention and the foam bodies obtained thereby. The general procedure and the apparatus utilized in the following examples, unless otherwise indicated, is as follows. A plastified mixture of virgin polystyrene resin, reground polystyrene resin, talc and flame-retardant is prepared, and a blowing agent mixture is incorporated into the plastified resin mixture to form a blowable resin mixture. A nucleation agent and a fire-retardant material are incorporated into the blowable mixture. The blowable resin mixture then is extruded through a die into one end of an elongated chamber maintained under vacuum whereupon the foamable mixture expands under controlled conditions to form a continuous board about 24 inches wide and with a thickness which can be varied as desired.

In Examples 1-5, the die is a fan-shaped die having a chord length of 8.66 inches, a radius of 5 inches and included angle of 120°. In Examples 6-18, the fan-shaped die has a chord length of 8.23 inches, a radius of 4.75 inches and an entry angle of 120°. As the blowable mixture is extruded into the vacuum chamber, expansion of the foamable mixture is controlled by arcuate rolls positioned above and below the plane to form a continuous board of about 1.5 to 2.0 inches in thickness as desired, and about 24 inches wide. Other thicknesses of board may be obtained by adjusting the die opening and the arcuate rolls position. The continuous foam board is passed through the vacuum chamber through a pool of water where the foam board cools and becomes more rigid. After passing through the pool of water, the foam body is withdrawn from the opposite end of the chamber, trimmed and cut as desired.

The foamed boards which are recovered from the vacuum chamber in accordance with the process of the present invention are evaluated for density, cell size, compressive strength, k-factor, etc., by techniques known in the art. The average cell size is an average of the cell sizes as determined in the X, Y and Z directions. The "X" direction is the direction of extrusion; the "Y" direction is the cross machine direction; and the "Z" direction is the thickness. The compressive strength of the foam bodies of the present invention are determined utilizing ASTM Test C165-83 entitled "Measuring Compressive Properties of Thermal Insulation".

The remaining details of the process and of the apparatus with respect to the specific examples are contained in the description of the examples.

EXAMPLES 1-5

A plastified mixture of 80 parts of virgin polystyrene resin [ARCO Dylene D8 having a melt flow index (MFI) of 5.0], 20 parts by weight of reground polystyrene, 0.15 part of talc and 0.85 part of flame-retardant is prepared, and the blowing agent mixture as specified below is incorporated into the plastified mixture to form the blowable resin mixture. Additional details of the process, and a summary of the characteristics of the foamed boards obtained are summarized in the following Table I.

TABLE I

| | Polystyrene Board Characteristics | | | | |
|---|---|---|---|---|---|
| Example | 1 | 2 | 3 | 4 | 5 |
| Blowing Agent (Pbw) | | | | | |
| 32% F-12/68% F-142(b) | 8.5 | 8.5 | 8.5 | — | — |
| 40% F-22/60% F-142(b) | — | — | — | 7.4 | 7.4 |
| Throughput Rate (lbs/hr) | 981.0 | 981.0 | 981.0 | 983.0 | 983.0 |
| Vacuum (in. Hg Abs.) | 14.7 | 13.5 | 13.5 | 13.5 | 13.5 |
| Product | | | | | |
| Actual Thickness (in.) | 1.410 | 1.540 | 1.510 | 1.510 | 1.530 |
| Density (Pcf) | 1.57 | 1.36 | 1.37 | 1.33 | 1.37 |
| Avg. Cell Size (mm.) | 0.48 | 0.50 | 0.53 | 0.50 | 0.57 |
| Cell Volume/cu. in. | 72318 | 61987 | 52611 | 62594 | 43216 |
| Compressive Strength (fresh, PSI) | — | 11.91 | 12.00 | 11.82 | 12.13 |
| k-Factor (fresh) | 0.149 | 0.161 | 0.178 | 0.150 | 0.154 |

EXAMPLES 6-8

The general procedure described above is repeated utilizing the recipe, blowing agent, blowing agent amounts throughput rate, die pressure and vacuum summarized in the following Table II. One significant distinguishing feature is that the amount of blowing agent incorporated into the plastified resin in these examples is increased to 11.1%. Some of the characteristics of the foamed boards obtained from these examples are summarized in Table II.

TABLE II

| | Polystyrene Foam Board Characteristics | | |
|---|---|---|---|
| Example | 6 | 7 | 8 |
| Recipe (Pbw) | | | |
| Virgin Resin | ARCO | ARCO | ARCO |
| Regrind (%) | 13.80 | 13.80 | 13.80 |
| Talc (%) | 0.24 | 0.37 | 0.37 |
| Flame-Retardant | 0.90 | 0.92 | 0.92 |
| Blowing Agent (Pbw) | | | |
| 40% F-22/60% F-142(b) | 11.1 | 11.1 | 11.1 |
| Throughput Rate (lb/hr) | 768 | 776 | 795 |
| Die Pressure (PSIG) | 469 | 471 | 459 |
| Vacuum (in. Hg. Abs.) | 15.2 | 21.2 | 21.0 |
| Product | | | |
| Actual Thickness (in.) | 2.050 | 2.040 | 2.020 |
| Density (Pcf) | 1.51 | 1.87 | 1.93 |
| Avg. Cell Size (mm) | 0.40 | 0.32 | 0.34 |
| Cell Volume/cu. in. | 132,216 | 249,623 | 212,283 |
| Compressive Strength (fresh, PSI) | 24.09 | 36.67 | 37.92 |
| k-Factor (fresh) | 0.163 | 0.153 | 0.154 |

EXAMPLES 9-14

The general procedure described above is used in these examples. In some of these examples, a different virgin polystyrene resin is utilized (Polysar HH-101 resin characterized by a melt flow index of 2.5), and carbon dioxide is utilized as one of the blowing agents. Other variables can be noted from the details reported in the following Table III.

TABLE III

| | Polystyrene Foam Board Characteristics | | | | | |
|---|---|---|---|---|---|---|
| Example | 9 | 10 | 11 | 12 | 13 | 14 |
| Recipe (Pbw) | | | | | | |
| Virgin Resin | ARCO | ARCO | POLYSAR | POLYSAR | POLYSAR | POLYSAR |
| Regrind (%) | 18.03 | 18.03 | 18.00 | 18.00 | 18.00 | 18.00 |
| Talc (%) | 0.45 | 0.45 | 0.38 | 0.13 | 0.35 | 0.13 |
| Flame-Retardant (%) | 0.99 | 0.99 | 0.90 | 0.93 | 0.93 | 0.93 |
| Blowing Agent (Pbw) | | | | | | |
| 32% F-12/68% F-142(b) | — | — | — | 10.600 | 10.600 | 10.600 |
| 40% F-22/60% F-142(b) | 9.650 | 9.650 | 9.100 | — | — | — |

TABLE III-continued

| | Polystyrene Foam Board Characteristics | | | | | |
|---|---|---|---|---|---|---|
| Example | 9 | 10 | 11 | 12 | 13 | 14 |
| $CO_2$ | 0.650 | 0.650 | 0.640 | 0.690 | 0.690 | 0.690 |
| Throughput Rate (lb/hr) | 803.0 | 808.0 | 810.0 | 793.0 | 788.0 | 788.0 |
| Die Pressure (PSIG) | 584 | 496 | 556 | 585 | 582 | 582 |
| Vacuum (in. Hg. Abs.) | 15.5 | 16.4 | 16.4 | 13.0 | 13.2 | 13.4 |
| Product | | | | | | |
| Actual Thickness (in.) | 1.94 | 2.03 | 1.540 | 2.230 | 2.180 | 2.260 |
| Density (Pcf) | 1.55 | 1.52 | 1.53 | 1.29 | 1.33 | 1.28 |
| Avg. Cell Size (mm) | 0.31 | 0.32 | 0.29 | 0.41 | 0.33 | 0.34 |
| Cell Volume/ cu. in. | 282,444 | 242,567 | 316,106 | 112,124 | 223,161 | 201,396 |
| Compressive Strength (fresh Psi) | 28.49 | 27.16 | 22.08 | 13.86 | 12.89 | 14.35 |
| k-Factor (fresh) | 0.164 | 0.165 | 0.154 | 0.175 | 0.170 | 0.174 |

As can be seen from the results reported in Tables II and III, although the level of blowing agent mixture added (including the carbon dioxide) in Examples 9-11 is lower than the 11% utilized in Examples 6-8, the average cell size of the foam prepared utilizing the F-22/F-142(b) blowing agent mixture with carbon dioxide is approximately 25% smaller than the average cell size in the similar density board produced in Example 6. The characteristics of the 2-inch boards prepared utilizing the F-12/F-142(b) blend and carbon dioxide exhibit good overall product quality and the average cell size is quite small even at densities in the 1.28-1.33 Pcf range (Examples 12-14).

EXAMPLES 15-18

The recipe, blowing agents and other variations in the process used in these examples are summarized in Table IV.

TABLE IV

| Example | 15 | 16 | 17 | 18 |
|---|---|---|---|---|
| Recipe (Pbw) | | | | |
| Virgin Resin | ARCO | ARCO | ARCO | POLYSAR |
| Regrind (%) | 13.00 | 13.00 | 12.10 | 12.10 |
| Talc (%) | 0.53 | 0.53 | 0.40 | 0.40 |
| Flame-Retardant (%) | 0.87 | 0.87 | 0.85 | 0.85 |
| Blowing Agent (Pbw) | | | | |
| 32% F-12/68% F-142(b) | 10.600 | 10.600 | 10.700 | 9.818 |
| Carbon Dioxide | — | — | 0.500 | 0.368 |
| Throughput Rate (lbs/hr) | 720 | 720 | 702 | 702 |
| Die Pressure (PSIG) | 662 | 669 | 731 | 730 |
| Vacuum (in. Hg. Abs.) | 13.5 | 13.2 | 11.1 | 11 |
| Product | | | | |
| Actual Thickness (in.) | 2.110 | 2.090 | 1.980 | 2.110 |
| Density (Pcf) | 1.51 | 1.53 | 1.37 | 1.35 |
| Avg. Cell Size (mm.) | 0.32 | 0.32 | 0.32 | 0.29 |
| Cell Volume/cu. in. | 243,065 | 245,121 | 249,816 | 337,747 |
| Compressive Strength (fresh, PSI) | 18.44 | 18.33 | 13.78 | 13.22 |
| k-Factor (fresh) | 0.148 | 0.145 | 0.152 | 0.152 |

As can be seen from the results of Table IV, polystyrene boards are produced at about 1.5 pcf density (Examples 15 and 16) with an Arco resin recipe utilizing the blend of CFC-12 and HCFC-142b, and the foam is characterized as containing small cells of 0.32 mm. Addition of carbon dioxide (Example 17) gave boards at a density of 1.37 pcf with the same cell size—0.32 mm— even though the cell nucleant (talc) was reduced more than 20%. In Example 18 where the higher molecular weight Polysar resin was substituted, cell size was even smaller than the previous examples, and the density was 1.35 pcf.

As is apparent from the above description and examples, the process of the present invention for preparing foamed polystyrene bodies such as boards and billets utilizing a blowing agent comprising 1-chloro-1,1-difluoroethane and, optionally, (a) dichlorodifluoromethane, chlorodifluoromethane or mixtures thereof, and/or (b) carbon dioxide results in foamed bodies having acceptable and, in some instances, improved characteristics when the blowable mixture is extruded into a region of subatmospheric pressure. In the process of the present invention, mixtures of 1-chloro-1,1-difluoroethane with dichlorodifluoromethane and/or chlorodifluoromethane generally result in the formation of foam boards and billets having improved characteristics when compared to boards and billets prepared utilizing only the 1-chloro-1,1-difluoroethane as the blowing agent. Optimum results are obtained when carbon dioxide is utilized in combination with the above blowing agent or blowing agent mixtures. In particular, incorporation of from about 0.4 to about 1.5% by weight of carbon dioxide, based on the weight of the resin results in improved foam bodies, particularly when it is desired to produce foam bodies having lower densities (2 Pcf or less) and small cell sizes such as cells in the range of from about 0.2 to about 0.5 mm, and more generally, from about 0.2 to about 0.35 mm.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for preparing an extruded thermoplastic resin elongate foam body comprising an alkenyl-substituted aromatic resin characterized as having a density of between about 0.9 and about 3.5 pounds per cubic foot and an average cell size from about 0.2 to about 0.5 mm which comprises the steps of (A) heat plastifying said thermoplastic resin;

(B) adding from about 6 to about 16 parts by weight based on the weight of the resin of at least one fluid blowing agent comprising at least one of 1-chloro-1,1-difluoroethane, 1,1,1,2-tetrafluoroethane and 2-chloro-1,1,1,2-tetrafluoroethane;

(C) uniformly mixing the blowing agent in the resin under a pressure sufficient to prevent blowing of the resin thereby forming a blowable resin mixture;

(D) extruding the mixture into a region wherein the pressure is from about 2 to about 27 inches of mercury absolute wherein the blowable resin mixture expands into a foam body; and (E) cooling the foam body.

2. The process of claim 1 wherein the foam body obtained has a density of between about 0.9 and about 2 pounds per cubic foot.

3. The process of claim 1 wherein the blowing agent is a mixture comprising 1-chloro-1,1-difluoroethane,1,1,1,2-tetrafluoroethane, or 2-chloro-1,1,1,2-tetrafluorothane and at least one of dichlorodifluoromethane and chlorodifluoromethane.

4. The process of claim 1 wherein the blowing agent comprises a mixture of 1,1,1,2-tetrafluoroethane, or 2-chloro-1,1,1,2-tetrafluoroethane or 1-chloro-1,1-difluoroethane and carbon dioxide.

5. The process of claim 4 wherein the mixture is free of ethyl chloride, methyl chloride, methyl alcohol, ethyl alcohol and isopropyl alcohol.

6. The process of claim 3 wherein the blowing agent mixture also contains carbon dioxide.

7. The process of claim 6 wherein the mixture of blowing agents is free of methyl chloride, ethyl chloride, methyl alcohol, ethyl alcohol and isopropyl alcohol.

8. The process of claim 1 wherein the alkenyl-substituted aromatic thermoplastic resin is a polystyrene.

9. A process for preparing an extruded elongate foam body comprising a polystyrene and characterized as having a density of between about 0.9 and about 2.5 pounds per cubic foot which comprises the steps of;

(A) heat plastifying the polystyrene resin;

(B) adding from about 6 to about 16 parts by weight based on the weight of the polystyrene of a fluid blowing agent or mixture of blowing agents comprising 1-chloro-1,1-difluoroethane, 1,1,1,2-tetrafluoroethane, or 2-chloro-1,1,1,2-tetrafluoroethane;

(C) uniformly mixing the blowing agent in the resin under a pressure sufficient to prevent blowing of the resin whereby a blowable resin mixture is obtained;

(D) extruding the mixture into a region maintained at subatmospheric pressure wherein the blowable resin mixture expands into a foam body; and (E) cooling the foam body.

10. The process of claim 2 wherein the blowable mixture is extruded in step (D) into a region wherein the pressure is from about 2 to about 20 inches of mercury absolute.

11. The process of claim 3 wherein the blowing agent mixture comprises from about 25% to about 75% by weight of dichlorodifluoromethane or chlorodifluoromethane or a mixture thereof.

12. The process of claim 11 wherein from about 0.4% to about 1.5% by weight of carbon dioxide, based on the weight of the resin, is added to the plastified resin in step (B).

13. The process of claim 1 wherein such region is formed by an elongated chamber with such mixture passing through a die at one end of such chamber and such foam body passing through a pool of water at the opposite end of such chamber.

14. The process of claim 13 including the step of passing such mixture through a die at one end of such chamber, cooling such foam body in such chamber, and then passing such foam body from such chamber to atmosphere.

15. The process of claim 14 wherein such die is a fan shape die having an arcuate slot orifice, and controlling the expansion of the mixture by arcuate rolls positioned above and below the plane of the arcuate slot orifice.

16. The process of claim 15 wherein such arcuate rolls comprise a series of wafers driven for rotation at a controlled speed.

17. The process of claim 16 wherein the rolls above the plane of the orifice are floatingly supported to exert a controlled floating pressure on the mixture as it exits the die.

18. The process of claim 1 including the step of passing such mixture through a fan shape die in such region to form a continuous foam body board.

19. The process of claim 18 including the step of confining the mixture as it exits such fan shape die of floating shaping rolls.

20. A process for preparing an extruded elongate foam body comprising a polystyrene and characterized as having a density of between about 0.9 and about 2 pounds per cubic foot which comprises the steps of (A) heat plastifying the polystyrene resin;

(B) adding from about 6 to about 16 parts by weight based on the weight of the polystyrene of a fluid blowing agent or mixture of blowing agents comprising 1,1,1,2-tetrafluoroethane, 2-chloro-1,1,1,2-tetrafluoroethane, or 1,chloro-1,1-difluoroethane;

(C) uniformly mixing the blowing agent in the resin under a pressure sufficient to prevent blowing of the resin whereby a blowable resin mixture is obtained;

(D) extruding the mixture into a region maintained at subatmospheric pressure wherein the blowable resin mixture expands into a foam body; and (E) cooling the foam body.

21. The process of claim 20 wherein the blowing agent mixture added in step (B) comprises 1,1,1,2-tetraflouroethane, 2-chloro-1,1,1,2-tetrafluoroethane, or 1-chloro-1,1-difluoroethane and at least one of dichlorodifluoromethane and chlorodifluoromethane.

22. The process of claim 21 wherein the mixture comprises from about 50 to about 75 parts by weight of 1,1,1,2-tetraflouroethane,2-chloro-1,1,1,2-tetrafluoroethane, or 1-chloro-1,1-difluoroethane and from about 25 to about 50 parts by weight of dichlorodifluoromethane, or chlorodifluoromethane, or mixtures thereof.

23. The process of claim 20 wherein the blowing agent comprises a mixture of 1,1,1,2-tetraflouroethane, 2-chloro-1,1,1,2-tetrafluoroethane, or 1-chloro-1,1-difluoroethane and carbon dioxide.

24. The process of claim 23 wherein from about 6% to about 12% by weight of 1,1,1,2-tegrafluoroethane, 2-chloro-1,1,1,2-tetrafluoroethane, or 1-chloro-1,1-difluoroethane and from about 0.4% to about 1.5% by weight of carbon dioxide is added in step (B), based on the weight of the resin.

25. The process of claim 21 wherein the mixture also contains carbon dioxide.

26. The process of claim 20 wherein the blowing agent comprises a mixture of 1-chloro-1,1-difluoroethane, at least one of 1,1,1,2-tetraflouroethane, 2-chloro-1,1,1,2-tetrafluoroethane, or dichlorodifluoromethane and chlorodifluoromethane, and carbon dioxide, and the foam body prepared by the process is characterized as having a density of between about 0.9 and about 1.6 pounds per cubic foot.

27. The process of claim 26 wherein the density is below about 1.4 pounds per cubic foot.

28. The process of claim 20 wherein the subatmospheric pressure utilized in step (C) is from about 2 to about 27 inches of mercury absolute.

29. The process of claim 26 wherein the subatmospheric pressure utilized in step (C) is from about 2 to about 20 inches of mercury absolute.

30. The process of claim 20 wherein such region of less than atmospheric pressure is formed by an elongated chamber with such mixture passing through a die at one end of such chamber and such foam body passing through a pool of water at the opposite end of such chamber.

31. The process of claim 30 including the step of passing such mixture through a die at one end of such chamber, cooling such foam body in such chamber, and then passing such foam body from such chamber to atmosphere.

32. The process of claim 31 wherein such die is a fan shape die having an arcuate slot orifice, and controlling the expansion of the mixture by arcuate rolls positioned above and below the plane of the arcuate slot orifice.

33. The process of claim 32 wherein such arcuate rolls comprise a series of wafers driven for rotation at a controlled speed.

34. The process of claim 33 wherein the rolls above the plane of the orifice are floatingly supported to exert a controlled floating pressure on the mixture as it exits the die.

35. The process of claim 20 including the step of passing such mixture through a fan shape die in such region of less than atmospheric pressure to form a continuous foam body board.

36. The process of claim 35 including the step of confining the mixture as it exits such fan shape die by floating shaping rolls.

37. A process of preparing an extruded polystyrene resin elongate foam body characterized as having a density of from about 0.9 to about 2 pounds per cubic foot, an average cell size of from about 0.2 to about 0.5 mm. and improved compressive strength which comprises the steps of
(A) heat plastifying a polystyrene resin;
(B) incorporating into the plasticized resin, a mixture of fluid blowing agents comprising
   (B-1) 1-chloro-1,1-difluoroethane;
   (B-2) at least one of dichlorodifluoromethane and chlorodifluoromethane; and
   (B-3) carbon dioxide;
(C) uniformly mixing the blowing agents in the resin under a pressure sufficient to prevent blowing of the resin whereby a blowable resin mixture is formed;
(D) extruding the blowable mixture to a region of subatmospheric pressure wherein the blowable resin mixture expands into a foam body; and
(E) cooling the foam body.

38. The process of claim 37 wherein from about to 13% by weight of a mixture comprising 50% to 75% of (B-1) and 25% to 50% of (B-2), and about 0.4% to about 1.5% of carbon dioxide, based on the weight of resin are added in step (B).

39. The process of claim 37 wherein the subatmospheric pressure in step (D) is from about 2 to about inches of mercury absolute.

40. The process of claim 37 wherein the subatmospheric pressure is from about 2 to about 20 inches of mercury absolute, and the elongate foam body obtained has a density of from about 0.9 to about 1.4 pounds per cubic foot.

41. The process of claim 37 wherein such region of less than atmospheric pressure is formed by an elongated chamber with such mixture passing through a die at one end of such chamber and such foam body passing through a pool of water at the opposite end of such chamber.

42. The process of claim 41 including the step of passing such mixture through a die at one end of such chamber, cooling such foam body in such chamber, and then passing such foam body from such chamber to atmosphere.

43. The process of claim 42 wherein such die is a fan shape die having an arcuate slot orifice, and controlling the expansion of the mixture by arcuate rolls positioned above and below the plane of the arcuate slot orifice.

44. The process of claim 43 wherein such arcuate rolls comprise a series of wafers driven for rotation at a controlled speed.

45. The process of claim 44 wherein the rolls above the plane of the orifice are floatingly supported to exert a controlled floating pressure on the mixture as it exits the die.

46. The process of claim 37 including the step of passing such mixture through a fan shape die in such region of less than atmospheric pressure to form a continuous foam body board.

47. The process of claim 46 including the step of confining the mixture as it exits such fan shape die by floating shaping rolls.

48. The process of claim 1 wherein the blowing agent includes carbon dioxide.

49. The process of claim 48 wherein the amount of carbon dioxide is from about 0.4 to about 1.5% by weight based on the weight of the resin.

50. The process of claim 1, wherein the density is between about 0.9 to 2.5 pounds per cubic foot.

51. The process of claim 20 wherein the blowing agent includes carbon dioxide.

52. The process of claim 51 wherein the amount of carbon dioxide is from about 0.4 to about 1.5% by weight based on the weight of the resin.

* * * * *